Figure 1:
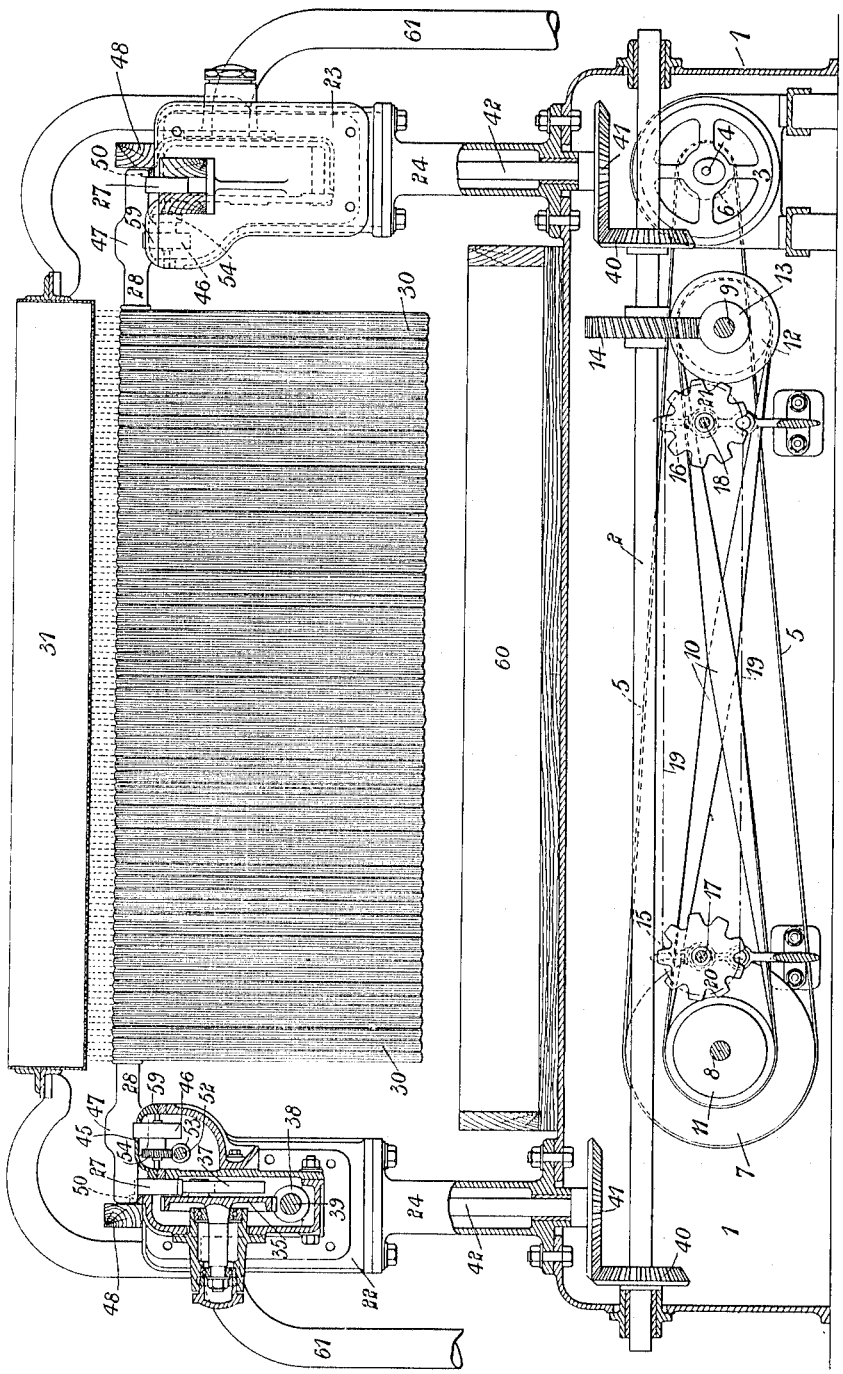

J. CLAYTON.
APPARATUS FOR LIQUID TREATMENT OF HANKS OF THREAD, &c.
APPLICATION FILED OCT. 28, 1913.

1,116,242.

Patented Nov. 3, 1914.
5 SHEETS—SHEET 1.

WITNESSES

INVENTOR
JAMES CLAYTON
By Attorneys

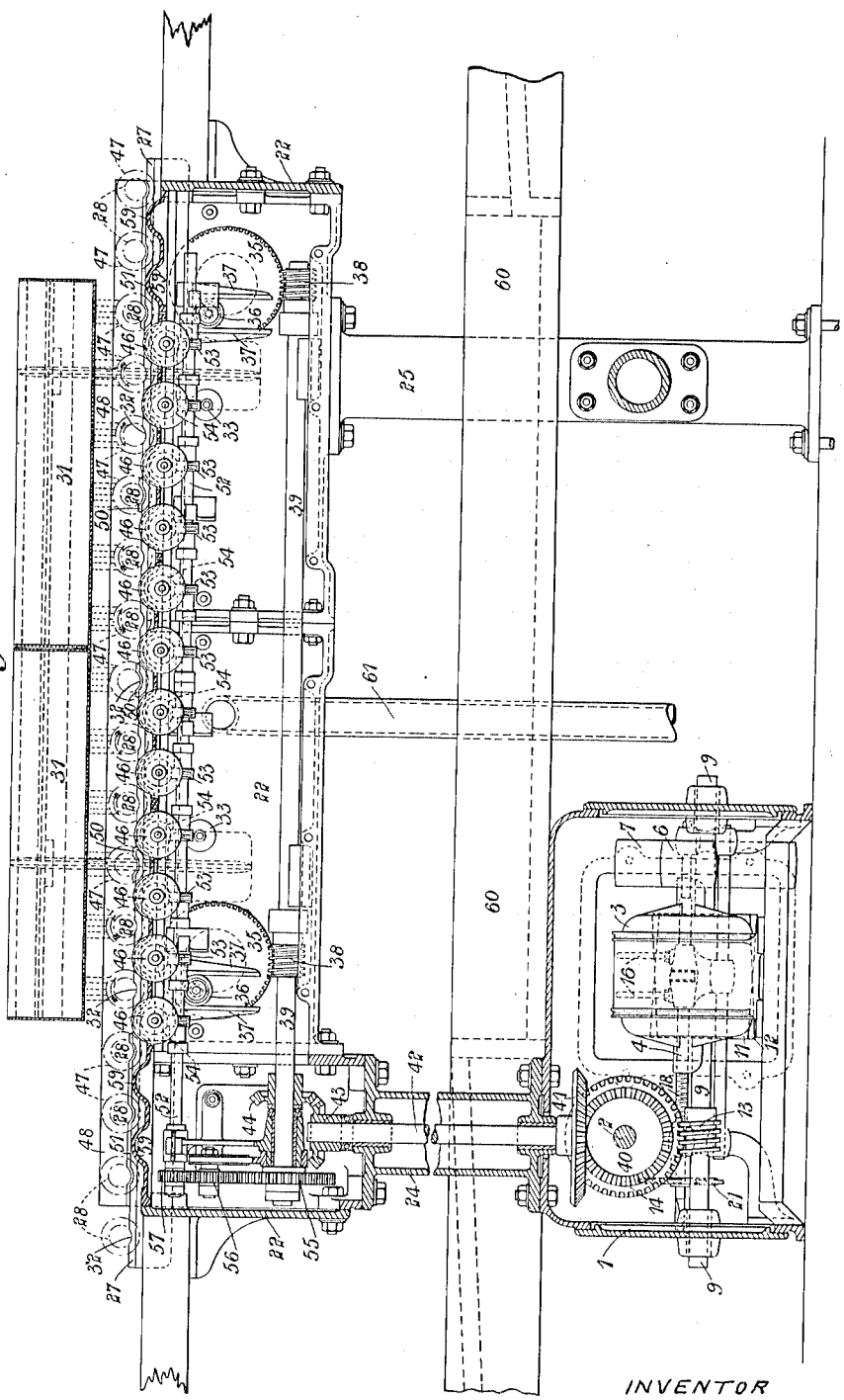

J. CLAYTON.
APPARATUS FOR LIQUID TREATMENT OF HANKS OF THREAD, &c.
APPLICATION FILED OCT. 28, 1913.
1,116,242.
Patented Nov. 3, 1914.
5 SHEETS—SHEET 3.
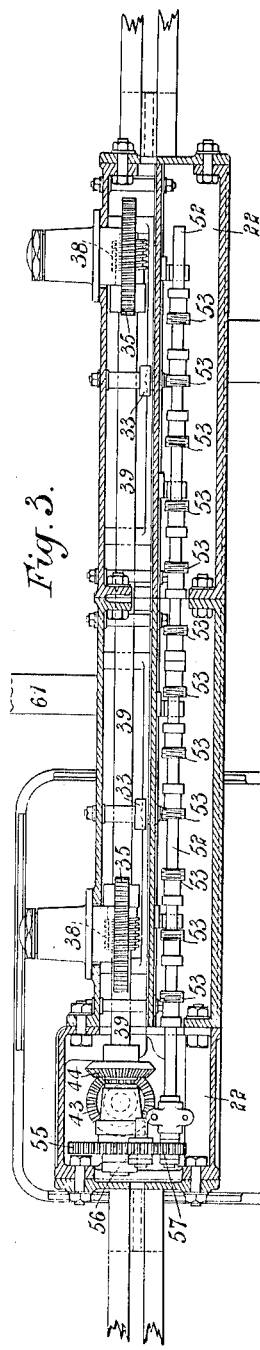
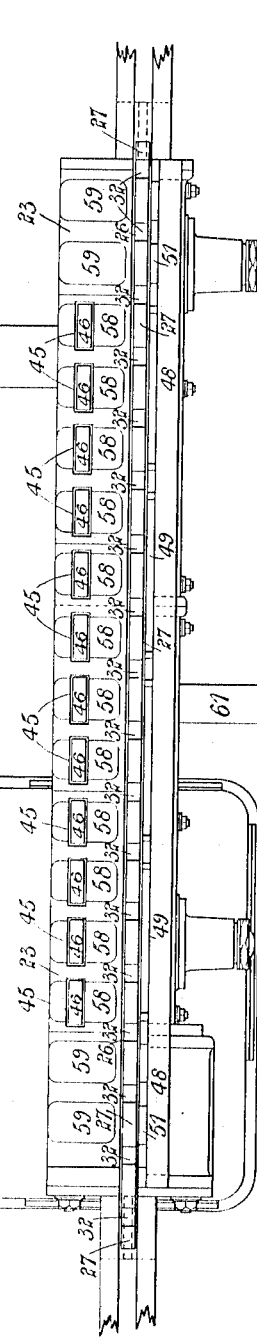
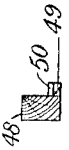

J. CLAYTON.
APPARATUS FOR LIQUID TREATMENT OF HANKS OF THREAD, &c.
APPLICATION FILED OCT. 28, 1913.

1,116,242.

Patented Nov. 3, 1914.
5 SHEETS—SHEET 5.

WITNESSES

INVENTOR
JAMES CLAYTON

UNITED STATES PATENT OFFICE.

JAMES CLAYTON, OF COVENTRY, ENGLAND, ASSIGNOR TO COURTAULDS, LIMITED, OF LONDON, ENGLAND.

APPARATUS FOR LIQUID TREATMENT OF HANKS OF THREAD, &c.

1,116,242.  Specification of Letters Patent.  Patented Nov. 3, 1914.

Application filed October 28, 1913. Serial No. 797,810.

*To all whom it may concern:*

Be it known that I, JAMES CLAYTON, a subject of the King of Great Britain, residing at 12 Middleborough road, Coventry, in the county of Warwick, England, have invented new and useful Improvements in Apparatus for Liquid Treatment of Hanks of Thread, &c., of which the following is a specification.

This invention consists in improvements in apparatus for bleaching, dyeing, washing, or otherwise treating with liquid, hanks of thread, yarn, silk, or other fibrous materials, the said apparatus being of the kind in which the hanks of thread, yarn, silk, or other fibrous material, under treatment (for brevity hereinafter referred to as hanks of thread) are hung on rods which carry them through the apparatus wherein they are subjected to the action of liquid, and the invention provides for so arranging and incasing, or covering, the operative parts of the apparatus that the said parts, are, as far as is practicable, protected from injury by the liquid, and fluid (preferably fresh air) can be admitted, at any desired pressure, into the casing, or casings, inclosing, or covering the said parts, which fluid can be allowed to escape by any apertures there may be in the said casing, or covering, or casings, or coverings, for instance, those through which some of the operative parts project, so that any liquid that may have been thrown onto the casing, or covering, or casings, or coverings, or onto the said projecting parts, is, by the pressure of the escaping fluid, prevented from entering the said apertures. By this means liquid is effectually prevented from gaining access to the protected operative parts of the apparatus, which liquid, especially when of a corrosive nature, would injuriously affect the metal of the said parts while any fumes that may be given off by the liquid are directed, or carried, away, from such apertures by the escaping fluid.

The invention is therefore more especially applicable to apparatus in which corrosive liquids are employed, such, for instance, as, bleaching apparatus, and we will hereinafter describe it as applied to such an apparatus from which its general nature and application will also be understood.

The invention further consists in providing improved means whereby each of the rods, upon which the hanks of thread are suspended, is intermittently carried through the apparatus and at the proper times, caused to rotate, preferably first in one direction and then in the opposite direction so as to prevent entanglement of the threads of the hanks, while insuring that all parts of the said hanks under treatment are equally subjected to the action of the liquid and the invention also consists in improvements in minor details as hereinafter explained.

In the process of bleaching, the hanks of thread are generally carried through five apparatus (either used separately, or coupled together) of a plant in the following order, namely, a sulfiding apparatus, a sulfid-washing apparatus, a bleaching apparatus, an acidulating apparatus, and a final washing apparatus. As the function of each of these apparatus is to subject the hanks of thread to the action of liquid the said apparatus may be similar to each other in all respects; it is therefore preferred that they should all be constructed and arranged in accordance with this invention so as to prevent corrosive liquid from one apparatus gaining access to, and injuriously affecting the operating parts of, an associate apparatus which may be treating the hanks of thread with a non-corrosive liquid.

In describing a construction and arrangement of apparatus in accordance with this invention with reference to the accompanying drawings we will presume that the invention is applied to a bleaching apparatus.

Figure 4:
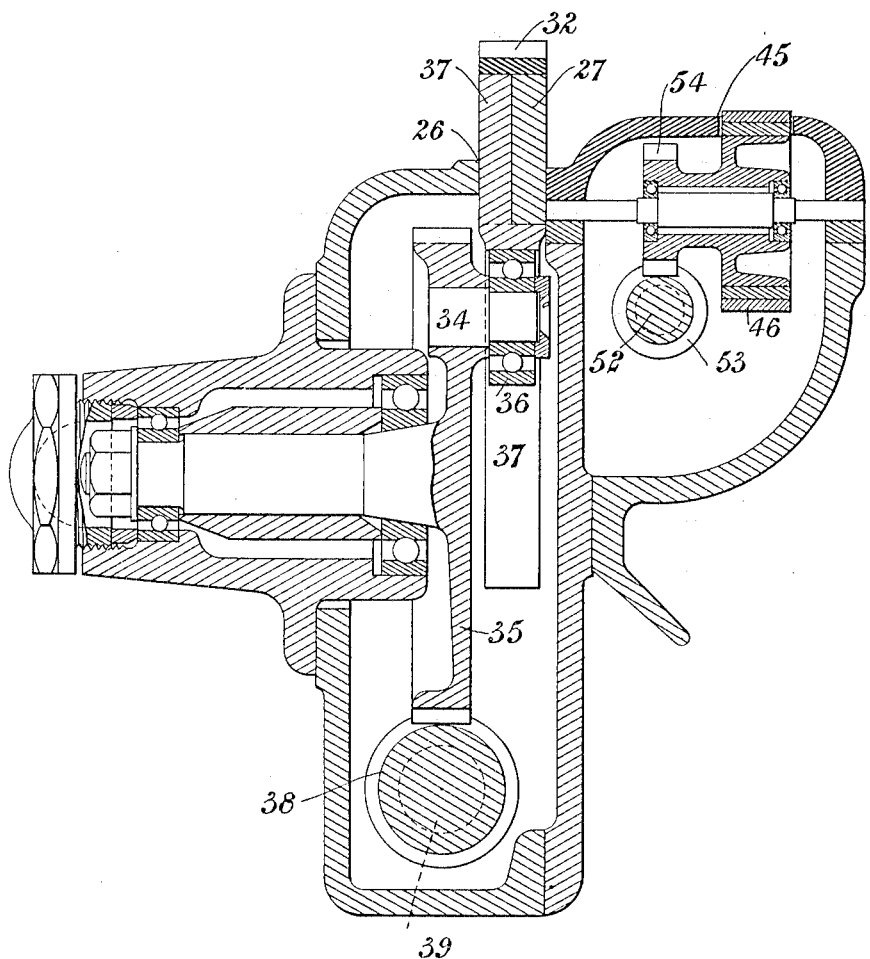
Figure 5:
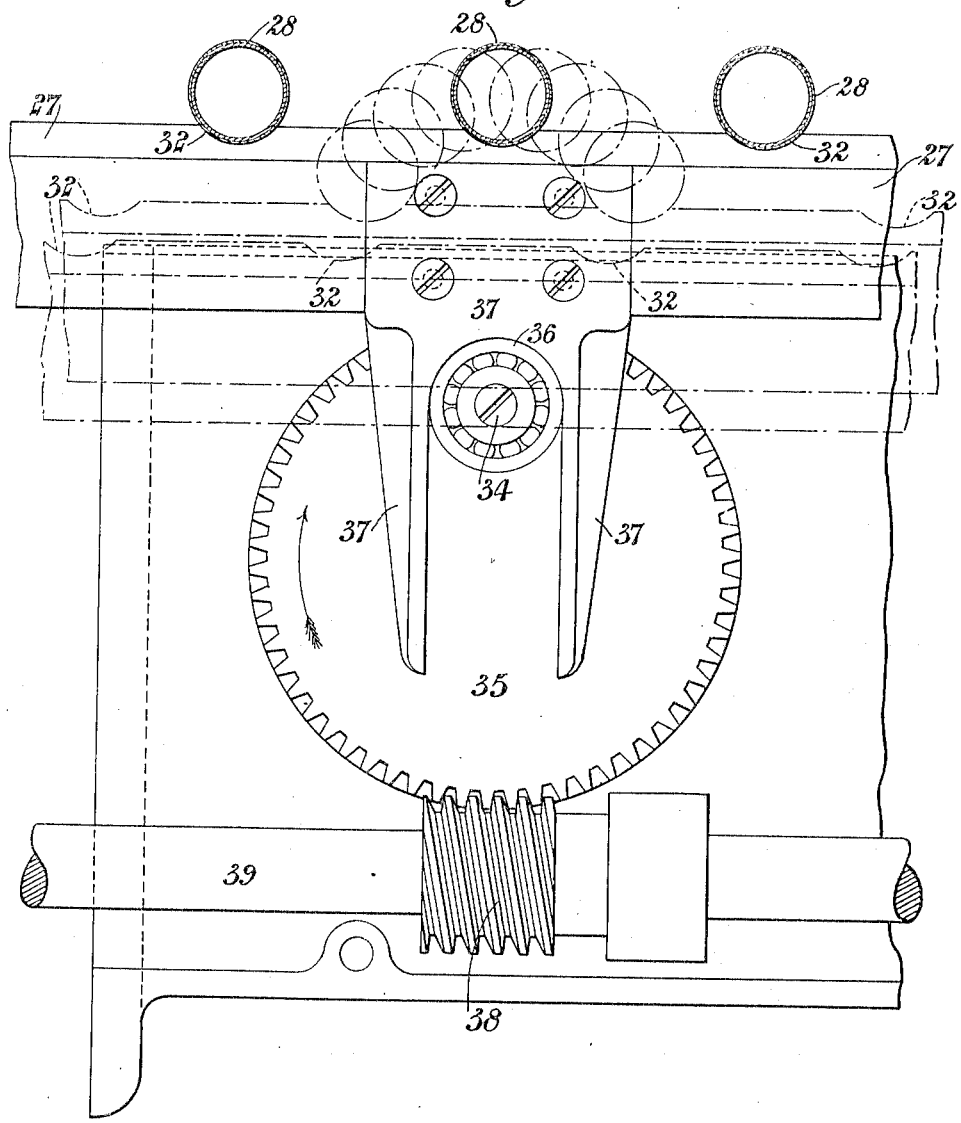

Figure 1 shows, in end elevation, (with parts in section) an apparatus constructed in accordance with this invention. Fig. 2 is a side elevation, with parts in section, and Fig. 3 is a plan, also with parts in section and with the rods which carry the hanks of thread removed. Figs. 4 and 5 show, in transverse section and side elevation respectively, the means for intermittently feeding the rods carrying the hanks of thread through the apparatus, and Figs. 6 and 7 show, in elevation and transverse section respectively, one of the beams and shelves for supporting the said rods out of contact with the rotating rollers, or wheels, when so required.

According to this invention I provide, on a suitable bed plate, or floor, a casing 1 which extends the entire width of the apparatus and is situated at, or toward, one end thereof. Within this casing is inclosed the main driving shaft 2 of the apparatus, the driving means whereof may be of any suitable description such as a belt from a live shaft, such driving means being however shown as consisting of an electric motor 3 transmitting rotary motion to the said main driving shaft 2, by an open belt 5, which passes around a pulley 6, on the electric motor shaft 4, and a pulley 7, on another shaft 8, which transmits rotary motion to an intermediate shaft 9, by a cross-belt 10, which passes around pulleys 11 and 12, on the shafts 8 and 9, respectively, the said shaft 9, then transmitting motion to the main driving shaft 2, by means of a worm 13, on the shaft 9, engaging with a worm-wheel 14, on the said main driving shaft. Any desired means can be used for varying the speed. For this purpose the pulleys 11 and 12, are shown as being coned, and shifters 15 and 16, are provided for moving the cross-belt 10, along the cones, the screwed spindles 17 and 18, of the said shifters being connected by a chain 19, passing around chain-wheels 20 and 21, on the said spindles respectively, so that movement is transmitted from one shifter to the other. At a suitable distance above the casing 1, (hereinafter referred to as the main driving shaft casing), are two casings 22 and 23, arranged parallel with each other and at right angles to the casing 1, and situated one at each end of the said casing 1. These casings 22 and 23, (hereinafter referred to as side casings), extend the entire length of the apparatus and each is supported at one end by the main driving shaft casing 1, through an intermediate casing 24, and at the other end by a column 25. Extending the entire length of the upper of each of the side casings 22 and 23, is an aperture 26, (see Fig. 3) through which projects a rail 27, adapted and operated to intermittently feed the rods 28, carrying the hanks of thread 30, through the apparatus. The rods 28, as they are conveyed through the apparatus, pass beneath a tank 31, situated above the space between the side casings 22 and 23 and the said rods, during their passage through the apparatus are caused, at the proper times, to rotate first in one direction and then in the opposite direction so that entanglement of the threads is prevented, and every part of the hanks of thread 30, is subjected to the action of the liquid, which flows, through suitably arranged perforations, from the tank 31, onto the said hanks 30. The rails 27, have recesses 32, formed in their upper parts at suitable distances apart for receiving the ends of the rods 28, which extend across the apparatus from one rail 27, to the other, (see Fig. 1), and the said rails are normally supported upon rollers 33, rotatably mounted in the side casings 22 and 23. The rails 27, are operated, to feed the rods 28, through the apparatus, by crank-pins 34, carried on disks 35, rotatably mounted within the side casings 22 and 23, and upon the said crank-pins, (which are preferably provided with anti-friction rollers 36), bear the upper part of downwardly projecting forked pieces 37, secured to the said rails toward the ends thereof (see more particularly Figs. 4 and 5). At each rotation of the disks 35, the two rails 27, are, by the crank-pins 34, simultaneously raised off their supporting rollers 33 and moved rearward (that is in the direction in which the hanks pass through the apparatus) and then are lowered onto the said rollers and moved forward, (that is, back to their former position) so that, by these movements of the rails 27, the rods 28, with the hanks of thread 30, thereon, are intermittently fed through the apparatus as hereinafter more particularly explained. Any convenient means may be employed for rotating the disks 35, but it is preferred to effect this by forming the said disks as worm wheels, with which engage worms 38, secured to shafts 39, rotatably mounted longitudinally in the side casings 22 and 23, the said shafts 39, having rotary motion transmitted to them by means of bevel wheels 40, secured at, or toward, the ends of the main driving shaft 2, of the apparatus, which bevel wheels gear with bevel wheels 41. secured to the lower ends of vertical shafts 42, which pass through the before mentioned intermediate casings 24, and enter the forward ends of the side casings 22 and 23, respectively, the upper ends of the said vertical shafts 42, having bevel wheels 43, which engage with bevel wheels 44, secured to the forward ends of the aforesaid worm shafts 39.

Toward the inner side of the upper part of each of the side casings 22 and 23, are apertures 45, at suitable distances apart, through which project the upper parts of rollers, or wheels, 46, rotatably mounted within the said casings. The longitudinal axis of each roller, or wheel, 46, on the side casing 22, is in alinement with the longitudinal axis of a similar roller, or wheel, on the side casing 23, and constitutes therewith a pair, each roller, or wheel, of which is caused to rotate in the same direction, although different pairs, or sets of pairs, of the said rollers, or wheels, are caused to rotate in opposite directions as hereinafter explained. The rods 28, with the hanks of thread 30, thereon, as they proceed, step by step, through the apparatus, are deposited between two pairs of rollers, or wheels, 46, in succession, and these rollers, or wheels, impart rotary motion (preferably by frictional contact) to the said rods 28, which are preferably provided with enlarged parts 47, to engage with the said rollers, or wheels. Any desired number of pairs of rollers, or wheels, 46, may be employed, for instance twelve pairs, and it is preferred to arrange these pairs in groups of three which groups are caused to rotate in opposite directions, that is to say, in such case the first group of three pairs of rollers, or wheels, will be rotated in one direction, and the second group of three pairs will be rotated in the opposite direction, and the third group will be rotated in the same direction as the first group and the fourth group will be rotated in the same direction as the second group, so that the rods 28, will be rotated in a direction in accordance with the directions of rotation of the said groups of pairs of rollers, or wheels. As the rollers, or wheels, 46, of the last pair in each group, rotate in a direction opposite to that in which the rollers, or wheels, 46 of the first pair in the next succeeding group rotate, rotary motion cannot be imparted to the rods 28, between such rollers and, in order to prevent the undue friction which would arise if the rods were deposited between such rollers, the said rods are at such places deposited on supports which maintain them out of contact with the said rollers, or wheels. For this purpose each of the beams 48, which prevent endwise movement of the rods 28, is provided with a shelf 49, having raised parts 50, arranged as shown clearly in Figs. 6 and 7, upon which raised parts the ends of the said rods 28, are placed and supported out of contact with oppositely rotating rollers, or wheels, 46. If desired, the shelves 49, may also be provided, at their rear and forward ends, with other raised parts 51, upon which the rods 28, are placed and supported before and after passing beneath the tank 31.

Any convenient means may be provided for effecting the aforesaid rotary motion of the respective pairs of rollers, or wheels, 46, for example, shafts 52, rotatably mounted in the side casings 22 and 23 provided with worms 53, which engage with worm wheels 54, formed in one with, or secured to, each of the said rollers, or wheels, 46, and rotation in the desired direction can be effected by forming the threads on the worms 53, right, and left, handed, and correspondingly forming the teeth on the worm wheels 54. Rotary motion may be transmitted to these shafts 52, from the hereinbefore mentioned shafts 39, in the side casings 22 and 23, by a toothed wheel 55, secured to each of the shafts 39, which wheel 55, through an intermediate wheel 56, transmits rotary motion to a toothed wheel 57, secured to each of the said shafts 52.

In order that the sides of the rollers, or wheels, 46, shall be exposed as little as possible I may form protuberance 58, on the upper part of the side casings 22 and 23, and, in these protuberances, make apertures 45, through which the said rollers or wheels, 46, project, and, if desired, protuberances 59, may be formed on the forward and rearward ends of the said casings, which act in conjunction with, or in substitution for, the raised bearing parts 51, to receive the rods 28, before and after passing beneath the tank 21.

When starting the apparatus a rod 28, having hanks of thread 30, hung thereon is placed in the first of the series of recesses 32, in the forward ends of the rails 27, and upon the ascending and backward movement of the rails, this rod is lifted over the first pair of protuberances 59, on the forward ends of the side-casings 22 and 23, and, by the descending movement of the rails 27, is deposited between this and the second pair of protuberances 59, onto the bearing piece 51, the rails 27, then returning to their initial position where a second rod 28, with hanks of thread 30, thereon, is placed in the aforesaid first of the series of recesses 32, in the said rails. Upon the next ascending and backward movement of the rails 27, both rods 28, are raised and carried toward the tank 31, for treatment, the first rod 28, being now deposited between the second and third pair of protuberances and the second rod being deposited between the first and second pair of protuberances, the rails 27, again returning to their initial position to receive another rod 28, and so on until the first rod 28, is lifted over the first pair of rotating rollers, or wheels, 46, and deposited between this pair and the second pair of rotating wheels, or rollers 46, and thereby rotated, the hanks of thread 30 on the rod 28, being treated by the liquid flowing through the perforations formed in the bottom of the tank 31, the rails 27, meanwhile returning to their initial position, as before, to receive another rod 28, at their forward ends. The next ascending and rearward movement of the rails 27, advances the rods 28, thereon one step as before, the first and second rods then both rotating and the hanks on both being under the action of the liquid. The next ascending and rearward movement of the rails 27, carries the first mentioned rod 28 to a position above the space between the last pair of the rollers or wheels 46 of the first group rotating in one direction, and the first pair of rollers, or wheels, 46, of the next group, rotating in the other direction and deposits the said rod onto the bearing piece 50, out of contact with the said rollers, or wheels, and the said rod is therefore not rotated but the hanks of thread 30, thereon meantime still undergo treatment from the liquid which flows from the tank 31. The next ascending and rearward movement of the rails 27, carries the first rod 28, between the first and second pairs of rollers, or wheels 46 of the second and oppositely rotating, group of rollers, or wheels, and, when deposited between them, the said rod is rotated in a direction opposite to that in which it had previously been rotated, and, by each succeeding rearward and forward movement of the said rails, the rods 28, thereon are further advanced through the apparatus and rotated in one, or the other, direction, or are not rotated, as the case may be, and another rod is placed on their forward ends until the rods eventually arrive at the rear end of the said rails 27, where they may be either removed, or deposited on similar rails of succeeding apparatus where the hanks of thread 30, undergo further treatment. In this manner the rods 28, are fed step by step through the apparatus and the hanks of thread 30, thereon are subjected to the action of the liquid which flows thereon from the tank 31, above, through the perforations which may be arranged in any suitable way, for example at intervals as shown so that the said hanks of thread are subjected to the action of the liquid only when the rods 28, are deposited between the aforesaid pairs of rotating rollers, or wheels, 46, or on the stationary supports 50.

A tray 60, is provided for catching the liquid as it passes from the hanks of thread 30, the said tray being arranged between the side casings 22 and 23, and preferably above the main driving shaft casing 1, and the liquid so caught may be either re-used, or allowed to pass away, as desired.

It will be seen that by the construction and arrangement of the apparatus as described the working parts, with the exception of a portion of the rotating rollers, or wheels 46, and the upper part and ends of the rails 27 are inclosed and protected from the action of the liquid and the said rails 27, and the rollers, or wheels 46, should be made a working fit in the apertures 26 and 45, respectively so that the liquid cannot easily gain access through the said apertures, but in order to effectually prevent this access we prefer to admit fluid under pressure (preferably fresh air) into the side casings 22 and 23, and, if desired, also into the main driving shaft casing 1, which fluid, by escaping outward through the apertures, effectually overcomes any tendency for liquid to creep there-through. The escape of the fluid as aforesaid is also advantageous because it directs, or carries away, from the said apparatus any fumes that may be given off by the liquid. The fluid may be forced into the side casings 22 and 23, by any suitable means such for example, as a pump, or blower, situated in any convenient position away from the action of the liquid employed in the apparatus from which pump, or blower, the fluid may be conducted to the said side casings by pipes 61, which can be suitably protected and it may pass from the side casings through suitable openings into the intermediate casings 24, and therefrom, into the main driving shaft casing 1, or a separate supply of such fluid may be conducted to such casing 1, or there may be no such supply to that casing.

The parts of the apparatus most exposed to the action of the liquid, such, for instance, as the rods 28, upon which the hanks of thread 30, are hung, the rails 27, (or their upper part) which carry the said rods and the upper part, or a portion of the upper part, of the side casings 22 and 23, may be made of, or covered with, or protected by, any suitable material, (such for example as ebonite), which will be unaffected by the action of the liquid employed.

In apparatus in which a corrosive liquid is employed it is preferred to store the said liquid in a tank which is situated in a separate chamber, or in a part of the building separate from that in which the said apparatus is situated. This may be effected, for example, by arranging a storage tank in a chamber beneath the apparatus which may be erected on a suitably supported concrete floor. Any desired quantity of liquid may be forced, by means of a pump, or its equivalent, from this storage tank through suitable pipes to the tank above the apparatus.

The invention is not restricted to the precise details of construction and arrangement hereinbefore described and illustrated in the accompanying drawings as it will be evident that modifications may be made without departing from the nature of the invention; for example, if desired, the casing 1, may be omitted and the mechanism which is shown therein be covered by a plate above it, or be beneath a floor on which the other parts of the apparatus are erected.

What I claim is:—

1. In apparatus for subjecting hanks of fibrous material to the action of liquid, hank supporting rods, rails carrying said rods and provided with depending forked pieces, disks having crank pins engaging said forked pieces and means for driving the said disks whereby said rails are alternately raised and moved in one direction and then lowered and moved back to their former position so as to traverse the hank-carrying rods and the supported hanks through the apparatus, substantially as described.

2. In apparatus for subjecting hanks of fibrous material to the action of liquid, hank-supporting rods, rails for carrying the said rods, means for raising and moving said rails in one direction and then lowering and moving the same back to original position so as to traverse the hanks through the apparatus, together with rollers carried by the rails and on which said rods are supported, worm wheels on the shafts of said rollers, worms gearing therewith, said worms and worm wheels being so driven and arranged that the hank-supporting rods are rotated in opposite directions, substantially as described.

3. In apparatus for subjecting hanks of fibrous material to the action of liquid, hank-supporting rods, rails carrying said rods and means for acting on the said rails so that they are alternately raised and moved in one direction and then lowered and moved back to their former position, so as to traverse the hanks through the apparatus, means for rotating the rollers which support the hanks and casings to protect the operative parts which would otherwise be subject to injury by the liquid.

4. In apparatus for subjecting hanks of fibrous material to the action of liquid, hank-supporting rods, rails carrying said rods and means for acting on the said rails and rods, casings to protect the operative parts which would otherwise be subject to injury by the liquid and means to supply fluid under pressure to said casings, for the purpose set forth.

5. In apparatus for subjecting hanks of fibrous material to the action of liquid, hank-supporting rods, rails carrying said rods; two parallel side casings each having a plurality of apertures through each of which apertures projects one of said rails and each casing having also apertures from each of which projects a roller, or wheel, for rotating the said rods, means, inclosed within the said casings, for operating the rails and rollers, or wheels, for conveying the hanks through the apparatus and properly submitting them to the action of the liquid and means for admitting, to the said casings, fluid under pressure; substantially as hereinbefore explained.

6. In apparatus for subjecting hanks of fibrous material to the action of liquid, hank-supporting rods, rails carrying said rods, and rollers to rotate said rods, in combination with means for operating the said rails and rollers to convey the hanks through the apparatus and to submit the hanks to the action of the liquid, said rotating rollers being in groups rotatable in opposite directions, so that said rods, in their progress through the apparatus, are rotated first in one direction and then in the opposite direction.

7. In apparatus for subjecting hanks of fibrous material to the action of liquid, hank-supporting rods, rails carrying said rods and rollers to rotate said rods, in combination with means for operating the said rails and rollers to convey the hanks through the apparatus and to submit the hanks to the action of the liquid, and means to support the said rods out of contact with the rotating rollers, when required, said supporting means comprising a shelf having thereon raised parts and means for holding the rails thereon out of contact with rollers rotating in opposite directions.

8. In apparatus for subjecting hanks of fibrous material to the action of liquid, means for spraying the liquid and means for carrying the hanks through the apparatus beneath the sprayer, said means comprising hank-carrying rods, means for rotating the said rods and means for driving said rods, together with a casing which protects the said operating means, substantially as described.

In testimony whereof I have signed my name to this specification in the presence of two subscribing witnesses.

JAMES CLAYTON.

Witnesses:
KATHLEEN M. THOMPSON,
ERNEST HARKER.